United States Patent
Thompson

[11] 3,801,133
[45] Apr. 2, 1974

[54] LOAD LEVELLING AND ANTI-SWAY TRAILER HITCH

[76] Inventor: Woodrow F. Thompson, Highway 80, West Forest, Miss. 39192

[22] Filed: May 19, 1972

[21] Appl. No.: 255,238

[52] U.S. Cl............................ 280/406 A, 280/446 B
[51] Int. Cl............................................. B62d 53/00
[58] Field of Search............................. 280/406, 446

[56] References Cited
UNITED STATES PATENTS

| | | | |
|---|---|---|---|
| 3,600,004 | 8/1971 | Newkirk | 280/406 A |
| 3,588,145 | 6/1971 | Thompson | 280/477 |
| 2,940,776 | 6/1960 | Curtis | 280/406 |

Primary Examiner—Leo Friaglia
Assistant Examiner—Randall A. Schrecengost
Attorney, Agent, or Firm—Sughrue, Rothwell, Mion, Zinn & Macpeak

[57] ABSTRACT

A trailer hitch is provided with a ball and socket coupling and load levelling bars which are arranged for a pivotal movement about an axis coincident with the axis of the ball and socket coupling. The arrangement for pivoting the load levelling bars includes a two-part articulated housing member for receiving the ends of the load levelling bars which is provided with an anti-friction plate arranged for cooperation with a complementary braking surface. The housing member is coupled for rotation with a first beveled cam disc which cooperates with a second beveled cam disc, both of which are concentric with the axis of the socket to provide a variable load levelling force to each bar upon rotation of the housing about the axis. A hitch receiving socket is secured to a draw bar and either the socket or the entire draw bar assembly is pivotably mounted under the control of an adjustable resilient device to control the load levelling forces applied to the load levelling bars.

6 Claims, 12 Drawing Figures

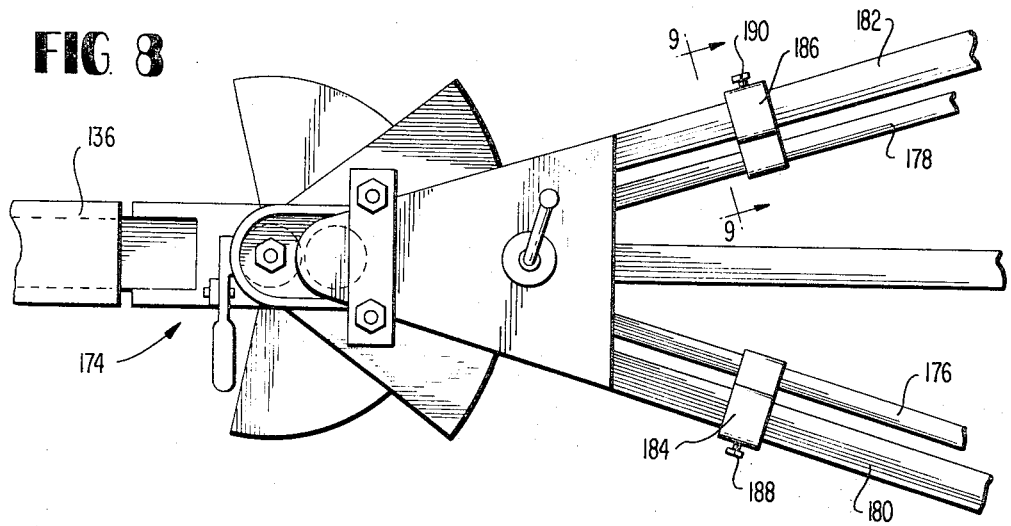
FIG. 8
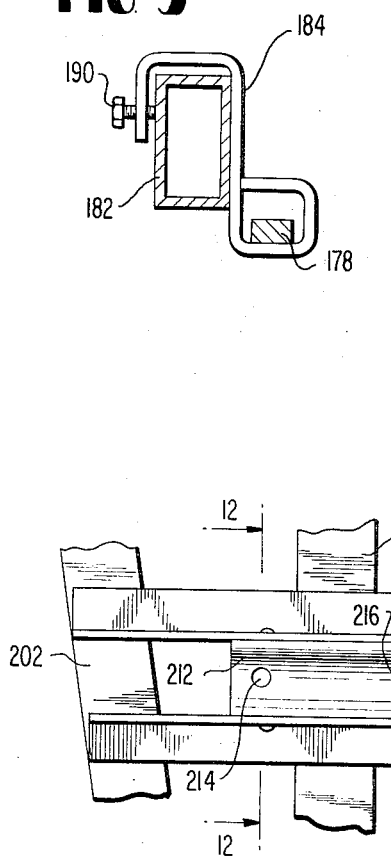
FIG. 9
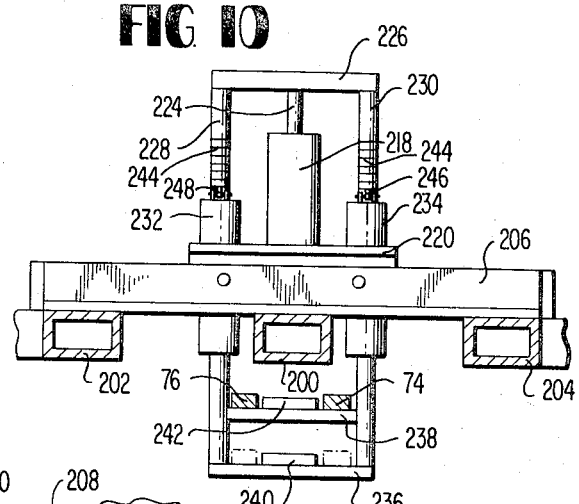
FIG. 10
FIG. 11
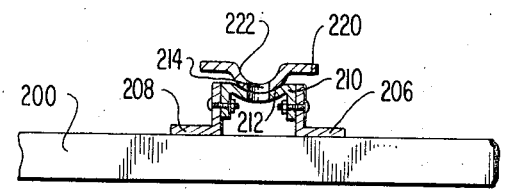
FIG. 12

LOAD LEVELLING AND ANTI-SWAY TRAILER HITCH

BACKGROUND OF THE INVENTION

1. Field of the Invention

This invention relates to a new and improved trailer hitch and more particularly to a trailer hitch having improved load levelling and anti-sway characteristics.

2. Prior Art

Although prior art devices have previously incorporated load levelling mechanisms in combination with a trailer hitch, these trailer hitches commonly utilized a pair of angularly related bars which were pivotally connected to the towing vehicle at two spaced-apart locations. Such a construction, although achieving the load levelling feature for which they were intended, provided a serious draw-back since the rods or bars were pulled out of line when turning. Such a push-pull action tended to cause a severe side pull or swaying action which seriously affected the operator's control of the towing vehicle.

Prior art trailer hitch devices also incorporated anti-sway devices which usually consisted of means for retarding the push-pull action of the load levelling bars referred to above. Other prior art devices attempted to provide a frictional restraint on the pivotal movement of the trailer portion of the coupling about a vertical axis relative to the draw bar portion of the coupling. These frictional anti-sway devices however, relied solely upon a pre-set frictional force and did not take into account variations in the load and the degree of turning movement.

The best known prior art arrangement is disclosed in applicant's own U.S. Pat. No. 3,588,145 which is directed to a load levelling and anti-sway control trailer hitch. In this patent, the load levelling bars are connected at one end to a housing which is mounted for pivotal movement about a vertical axis on the main coupling body coincident with the axis of the ball and socket connection. Jack means are provided on the trailer tongue for applying a load levelling force to the load levelling bars and friction plate means are secured to the upper surface of the housing for frictional engagement with a complementary friction surface on the main coupling body. Although the frictional force is directly related to the strain placed upon the load levelling bar, no means are provided for varying the load levelling forces in the individual bars relative to the degree of pivotal movement of the housing about the pivot axis. Applicant's prior patent also discloses means for pivotally mounting a coupling receiving member on the towing vehicle and controlling the pivotal movement by resilient spring means. However, no means are disclosed for controlling the resilient means to thereby control the angular position of the coupling receiving member and thereby control the force applied to the load levelling bars.

SUMMARY OF THE INVENTION

The present invention is directed to a trailer hitch having cam means for controlling the load leveling force applied to each load levelling bar dependent upon the degree of pivotal movement of the load levelling bars about the axis of a ball and socket coupling incident to the relative turning movement between a towing vehicle and a trailer.

The present invention is directed to a trailer hitch having draw bar means including pivoted coupling receiving means which is pivoted under the control of resilient means which are adjustable to vary the position of the pivoted coupling receiving means.

The present invention is directed to a trailer hitch having a ball and socket coupling and a pair of load levelling bars which are supported at one end of the trailer tongue and at their opposite ends by a two-part articulated housing which is mounted for pivotal movement about an axis coincident with the axis of the ball and socket coupling. The two part articulated housing is coupled to a beveled cam member which is operatively engageable with a beveled cam disc concentrically disposed relative to the axis of the ball and socket coupling. Friction plate means are secured to the housing and are disposed in complimentary frictional engagement with a frictional surface on the main body of the ball and socket coupling whereby the frictional force between the friction plate and the friction surface will be directly proportional to the load levelling forces applied to the load levelling bars. The main body of the ball and socket coupling is detachably received in a socket member which is pivoted under the control of adjustable resilient means to vary the position thereof and thereby vary the force applied to load levelling bars and to dampen vibrations attendant to travel over rough surfaces.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 8 is a top plan view of a modified load leveling bar arrangement.

FIG. 9 is a sectional view taken along the line 9—9 in FIG. 8.

FIG. 10 is a front elevation view, partly in section of a jack arrangement for the load levelling bars on a trailer tongue.

FIG. 11 is a top plan view of the arrangement shown in FIG. 10 with the jack removed.

FIG. 12 is a sectional view along the line 12—12 in FIG. 11.

DETAILED DESCRIPTION OF THE INVENTION

The two principal features of the present invention relate to the load levelling and anti-sway arrangement in the trailer hitch per se and the means for accomplishing the load levelling in the draw bar assembly. It is contemplated that the two aspects of the present invention may be utilized together or separately in combination with other prior art arrangements. For example, the trailer hitch arrangement shown in FIGS. 1 and 2 could be utilized with the draw bar arrangement shown in FIGS. 3–5 or it could be used with any other draw bar arrangement as long as the draw bar had a socket arrangement capable of receiving the attachment member for the trailer hitch. Likewise, the draw bar assembly shown in FIGS. 3–5 inclusive could be engaged with the trailer hitch shown in FIGS. 1 and 2 or with any other type of trailer hitch which is capable of being mounted in the hitch reqeiving socket on the draw bar assembly.

Figure 1:
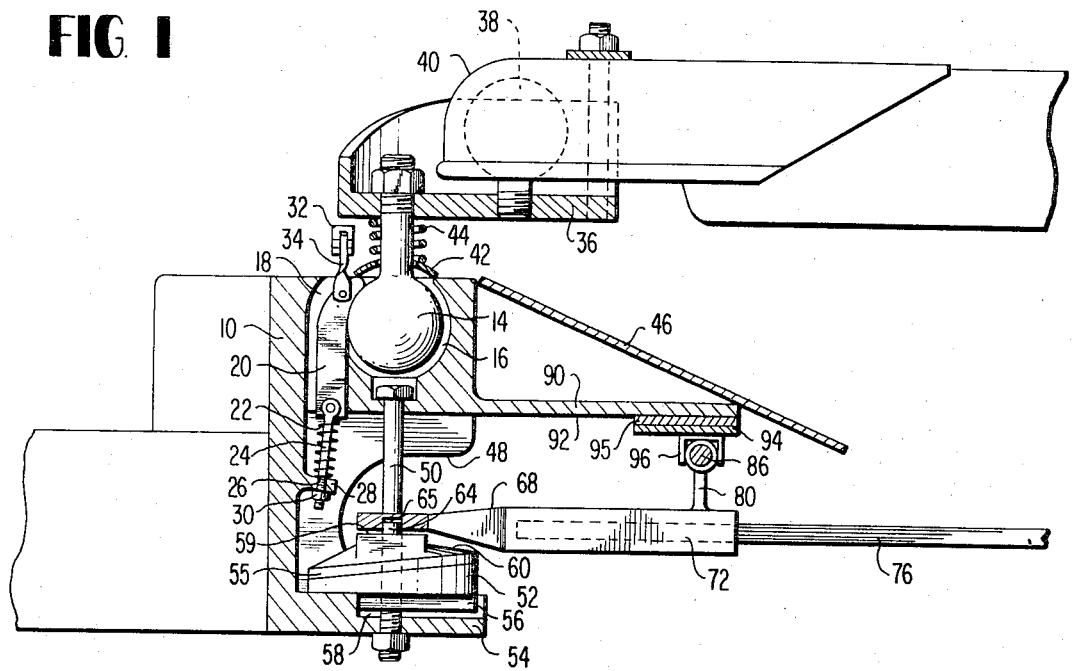
FIG. 1 is a side elevation view, partly in section, of the trailer hitch according to the present invention.
Figure 2:
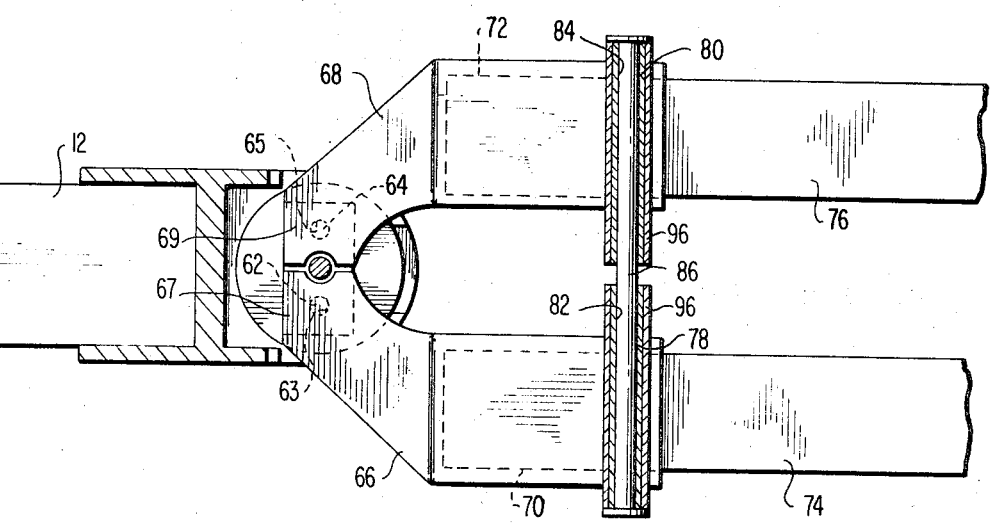
FIG. 2 is a top plan view, partly in section, of the hitch shown in FIG. 1.

Turning first to the trailer hitch arrangement shown in FIGS. 1 and 2, it is noted that the arrangement shown therein is very similar to the arrangement shown in FIGS. 28 and 29 of applicant's prior U.S. Pat. No. 3,588,145. The principal differences reside in the load levelling and anti-sway frictional arrangement.

The main body portion 10 of the trailer hitch is provided with a forwardly extending connecting bar 12 which is adapted to be received in any suitable socket on a draw bar arrangement. Any suitable means may be utilized for retaining the bar 12 within such a socket. A depending ball member 14, is shown disposed in a complementary socket 16 in the main body portion 10 of the trailer hitch assembly. The socket 16 is enlarged to form an additional chamber 18 at one side thereof for the reception of a locking bar 20. The locking bar is normally spring biased upwardly by means of a spring 22 surrounding a bolt 24 which is pivotally secured to the lower end of the locking bar 20 and loosely retained within the passage 26 extending through the flange 28 of the body portion 10 by means of a bolt 30. A pivoted operating lever 32 is connected to the upper end of the bar 20 by means of a connecting link 34. The bar 20 is normally biased upwardly and outwardly of the chamber 18 in order to allow the ball 14 to be inserted in the socket 16. Once the ball 14 is disposed within the socket 16, the lever 32 may be pivoted to force the locking bar 20 downwardly into engagement with the ball 14 to hold the same within the socket 16.

The ball 14 may be secured in any suitable manner to the forward end of the tongue of a trailer. The arrangement shown in FIG. 1 discloses the ball 14 as being secured to an adaptor plate 36, which in turn, has another ball 38 extending upwardly therefrom for insertion into the standard downwardly opening socket arrangement 40 which is secured to the tongue of a trailer. The plate 36 may be bolted to the socket portion 40. A dust cap 42 is biased downwardly to cover the ball 14 by means of a spring 44. It is also possible to utilize a reverse arrangement wherein the ball member would be secured to the main trailer hitch body 10 for cooperation with the standard downwardly opening socket member 40 on a standard trailer tongue. Such an arrangement would be similar to that shown in FIG. 40 of applicant's prior U.S. Pat. No. 3,588,145. A guide plate 46 is secured to the upper surface of the hitch body 10 to enable the ball member 14 to be guided upwardly into the socket 16 during a semi-automatic coupling operation. Such a semi-automatic coupling arrangement is described more fully in detail, along with variations thereof, in applicant's prior U.S. Pat. No. 3,588,145.

The main body portion 10 of the trailer hitch is provided with a forwardly extending recess 48 to provide suitable clearance for the pivotal action of the load levelling bar arrangement to be described hereinafter. A bolt 50 extends downwardly to an opening in the bottom center of the socket 16 and is threaded into the base of the main body portion 10. The bolt 50 acts as a pivot pin for the load levelling bar arrangement and is coaxially aligned with the axis of the depending ball member 14 when it is disposed in the socket 16. A first circular beveled cam disc 52 is disposed on the supper surface of the base 54 of the main body 10. The cam disc is provided with a depending key member 56 which cooperates with a complementary groove 58 in the base 54 to prevent the rotation of the cam disc 52 relative thereto. A flat thrust washer 55 of brass, copper or the like is disposed on the upper surface cam disc 52 and a second beveled cam disc 60 which is complementary to the first beveled cam disc 52 is disposed on the upper surface of the washer 55 so that the two cam discs and washer define a right cylinder having an axis concentric with the axis of the bolt 50 and ball member 14. The upper surface of the cam disc 52 lies in a plane which is angled upwardly and rearwardly from a low point adjacent the forward end of the hitch body 10. Both of the cam discs 52 and 60 are provided with a central aperture through which the bolt 50 freely extends. The upper surface of the disc 60 is provided with a narrow raised transversely extending horizontal surface 59. A pair of pins 62 and 64 are provided on the upper surface 59 of the cam disc 60 for engagement with complimentary sockets in the load levelling bar assembly.

The load levelling bar assembly is comprised of a pair of housings 66 and 68 each of which have a rearwardly opening socket 70 and 72, as best shown in FIG. 2, for the reception of the forward ends of the load levelling bars 74 and 76. The load levelling bars 74 and 76 may be of fairly rigid steel stock or of resilient spring steel depending on the forces needed and may have any suitable configuration. The load levelling bars extend rearwardly and are supported by suitable means to be described hereinafter. on the trailer tongue. The forward end of each of the housings 66 and 68 are provided with sockets 63 and 65 respectively, for reception of the pins 62 and 64 on the upper surface of the cam disc 60. A pair of upwardly extending brackets 78 and 80 are secured to the upper surface of each of the bar receiving housings 66 and 68 respectively, adjacent the rearwardly extending openings for the sockets 70 and 72. At the upper ends of the brackets 78 and 80, a pair of transversely extending aligned bores 82 and 84 are formed for the reception of a connecting rod 86. The connecting rod 86 is secured within the bores against longitudinal displacement but the brackets 78 and 80 are free to pivot about the rod 86.

The main body 10 of the trailer hitch is provided with a rearwardly extending flange 90 having a flat semi-circular under surface 92. A friction brake plate, having a friction liner 95 secured thereto and disposed in engagement with the surface 92, is provided with a downardly extending bracket 96 which is adapted to extend over the rod 86 to support the friction plate member 94 in operative frictional engagement with the surface 92. The exact configuration of the flange 90 and the manner in which the brake member 94 is operatively disposed between the flange and load levelling bar housing is similar to that arrangement shown in FIGS. 30 and 31 of applicant's prior U.S. Pat. No. 3,588,145.

Turning now to the operation of the load levelling and anti-sway features of the present invention, it is clear that an upwardly directed force may be applied to the ends of the load levelling bars 74 and 76 by any suitable means such as the jack member described hereinafter. This upward force is transmitted to the main body 10 of the trailer hitch assembly, which in turn, will transmit a force to the draw bar arrangement to distribute the load forwardly on the towing vehicle so that the rear end of the towing vehicle will not be unduly lower than the forward end thereof. In the straight line towing condition where the trailer is in direct alignment with the towing vehicle, the cam discs 52 and 60 will be disposed as shown in FIG. 1. In such a condition, the upward force of the load levelling bars 74 and 76 is imparted through the brackets 78 and 80 and the friction plate 94 to press the friction liner 95 into frictional engagement with the lower surface 92 of the flange 90. Such a frictional force tends to minimize any tendency for the trailer to sway out of alignment with the towing vehicle. However, during a turning operation where a misalignment of the towing vehicle and the trailer is intentionally brought about, the load levelling bars which are secured to the trailer will cause the load levelling bar receiving housings 66 and 68 to pivot relative to the axis of the bolt 50. Due to the fact that the housings 66 and 68 are coupled to the cam disc 60, the cam disc 60 will rotate relative to the cam disc 52, thus causing the thicker portion of the cam disc 60 to ride up on the thicker portion of the cam disc 52. Such a turning movement will transmit an additional force through the respective housing 66 or 68, depending upon the direction of turning and thereby place an additional lifting force on one of the load levelling bars 74 or 76 through the respective housing member 66 or 68. This additional load levelling force will be transmitted forwardly to the towing vehicle in proportion to the angle of turning movement to help compensate for the sway forces imposed on the turning vehicle during the turning movement. Thus, the load levelling force applied to one of the load levelling bars will be increased and the load levelling force in the other bar decreased during any turning operation to assist in maintaining control of the towing vehicle and trailer at all times.

For example, look at FIG. 2 and assume a right turn as being made. The relative movement between the cam discs 60 and 52 will cause the pin 62 to rise and the pin 64 to fall. The rising movement of the pin 62 will raise the housing member 66 and apply an additional lifting force to the load levelling bar 74 disposed therein. The housing 68 will be relieved of pressure but the downward movement of the housing 68 will be limited by engagement of the innermost portion 69 of the housing on the upper surface of the disc. This slight relative movement between the housings 66 and 68 is compensated for by the pivotal movement of their housings about rod 86. The increase in pressure on the bar 74 and the decrease in pressure on the bar 76 will impart a turning torque in a clockwise direction about the connector 12 as viewed from the rear of the car or towing vehicle. Since the left side of a car tends to dip downwardly in a right hand turn this clockwise torque will be in opposition to the dip or sway of the car and therefore tend to level the car.

Figure 3:
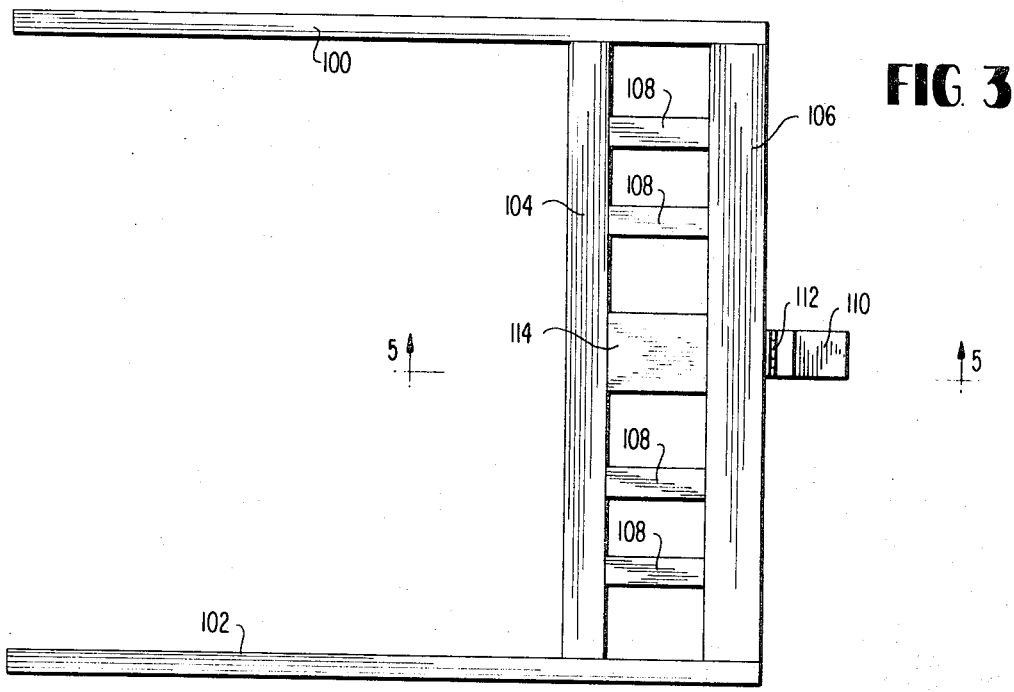
FIG. 3 is a top plan view of a draw bar assembly according to the present invention.
Figure 4:
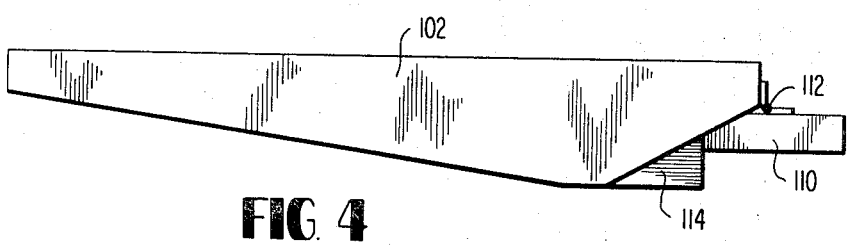
FIG. 4 is a side elevation view of the draw bar assembly shown in FIG. 3.
Figure 5:
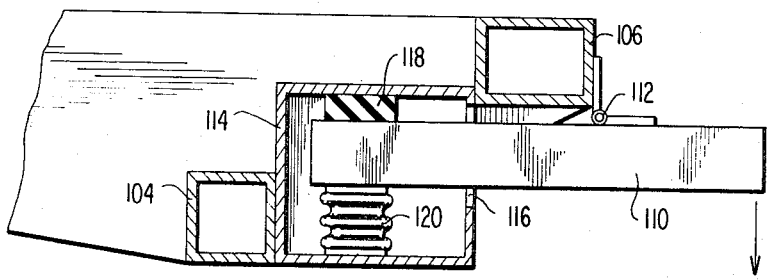
FIG. 5 is a sectional view of the draw bar assembly along the line 5—5 in FIG. 3.

Turning now to the draw bar assembly as illustrated in FIGS. 3,4,5, a pair of side plates 100 and 102 are provided and may be rigidly secured to the frame of the towing vehicle by any suitable means. Since the attachment means are well known in the art such as bolts or welding, it is not deemed necessary to go into detail with respect to this matter. A pair of cross tubular members 104 and 106 are connected between the plates 100 and 102 and in turn are connected by a plurality of short connecting members 108. A socket member 110, extends rearwardly from the truss member, centrally thereof for receiving the connecting bar of a trailer hitch similar to the bar 12 shown in FIG. 1. As stated previously, any suitable means may be provided for retaining the bar within the socket 110. The socket member 110 is pivoted to the cross bar 106 by means of a hinge 112. A control box 114 is secured to the two cross bars 104 and 106 by any suitable means, such as welding or the like and is provided with an aperture 116 through which the forwardly extending end of the socket member 110 extends. Within the control box 114, a pair of resilient members may be provided on the top and bottom of the socket member 110 to resiliently support the same.

In the simplest form of construction, the resilient members may be in the form of resilient rubber blocks which will act to dampen the vibrations imparted through the socket member 110 due to rough road conditions. It is also contemplated that coil spring means or any other suitable resilient means could be utilized for this purpose.

A more sophisticated arrangement of resilient means may be provided in the form of air bag similar to the conventional air bag utilized in automotive spring devices. In this embodiment, the member 118 is illustrated as a simple resilient block and member 12 is illustrated as an air bag having means for varying the pressure therein. The pressure for the air bag would be supplied from a suitable source on the vehicle similar to those air pressure sources now available on certain models as optional equipment. Suitable controls may be provided on the dashboard of the vehicle, whereby the pressure in the resilient air bag 120 may be selectively controlled, to thereby vary the force by which the socket 110 is held against the block 118. Such a variation in the force applied to the socket 110 will, of course, vary the operating characteristics of the load levelling bars assuming a trailer hitch similar to that shown in FIGS. 1 and 2 is utilized in conjunction with the draw bar in FIGS. 3–5. With such a means for controlling the load levelling force, it is possible to do away with the conventional jack member which is usually used to raise and lower the rear ends of the load levelling bars. By using the air bag arrangement, the device is capable of absorbing minor fluctuations due to rough road conditions to provide a smooth ride which will aid in the control of the vehicle and trailer at all times.

By utilizing the air bag arrangement for controlling the application of force to the load levelling bars and by using a hitch similar to that shown in FIG. 1, the operation of connecting a trailer to a towing vehicle is almost entirely automatic. With the trailer tongue disposed at the proper level by means of the trailer support rod, it is possible for a single person to merely back up the towing vehicle to the trailer. The use of the guide plate 46 will enable the automatic coupling of the ball 14 within the socket 16 and since the plate 46 is fairly wide, the degree of skill required in backing up the towing vehicle is reduced to a minimum. With the air pressure reduced in the air bag 120, it is an easy task to insert the load levelling bars 74 and 76 into a suitable bracket on the trailer tongue and into the sockets 70 and 72 on the trailer hitch. The air will then be supplied automatically to the air bag 120 by means of a suitable control on the dashboard of the vehicle to apply the proper load levelling force through the load levelling bars.

Figure 6:
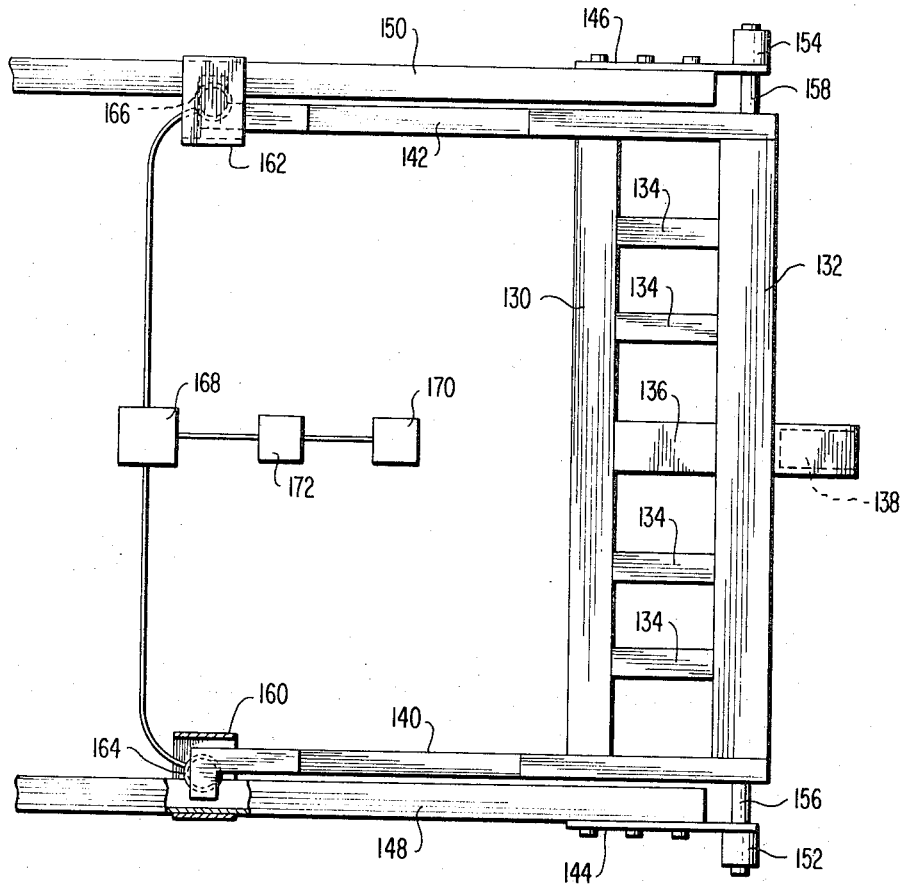
FIG. 6 is the top plan view of a modified draw bar assembly.

Instead of using the pivoted socket member 110 as shown in the embodiment of FIGS. 3–5 it is also possible to maintain the socket member rigid with the truss assembly and pivot the entire truss assembly relative to the vehicle on which it is mounted. As shown in FIG. 6, the draw bar is comprised of a pair of cross tubular members 130 and 132 connected together at different levels by means of short parallel connecting members 134. A rearwardly extending connecting member 136 is rigidly connected to the members 130 and 132 and is provided with a rearwardly opening socket 138 for the reception of the connecting bar on a trailer hitch. A pair of forwardly extending arms 140 and 142 are secured to the opposite ends of the cross members 130 and 132. A pair of bracket members 144 and 146 are rigidly secured to frame members 148 and 150 of the vehicle. Each bracket is provided with a socket member 152 and 154 respectively. Pin members 156 and 158 are secured to opposite ends of the cross member 132 and are rotatably received within the socket members 152 and 154 respectively.

Adjacent the forward ends of the arms 140 and 142, a pair of brackets 160 and 162 are mounted on the channel shaped frame members 148 and 150 of the vehicle. Inflatable air bags 164 and 166 or any other suitable device such as piston and cylinder arrangement are disposed within the open ended chambers formed by the bracket on the vehicle frame members with the forwardly extending bars 140 and 142 resting on the upper surface thereof. Each of the relatively small volume air bags 164 and 166 are disposed in constant direct communication with a substantially large volume compensation air bag 168. An air pressure source 170 is provided at any suitable location within the vehicle and is connected to the compensation air bag 168 through suitable conduits and the flow of air to and from the air bags can be controled by suitable valve means 172.

The operation of this embodiment is similar to the operation of the embodiment shown in FIGS. 3–5. Prior to connecting a trailer to the towing vehicle, the air bags 164, 166 and 168 would be deflated by operating the valve 172 to the exhaust position. A hitch member, generally shown at 174 in FIG. 8 would then be coupled to the connector member 136 of the draw bar assembly. The hitch shown in FIG. 8 is similar to that shown and discussed in detail in FIGS. 1 and 2 but in this instance, the load levelling bars 176 and 178 would not extend parallel to each other but would diverge rearwardly along the frame members 180 and 182 of the trailer tongue. Since the load levelling will be accomplished by the air bags on the draw bar assembly, it is unnecessary to utilize a jack arrangement for lifting the rear ends of the load levelling bars. Accordingly, a pair of simple brackets 184 and 186 are merely hooked over the frame members 180 and 182 as shown in FIG. 9 and secured thereto by means of set screws 188 and 190. The rearwardly extending end of the load levelling bars 176 and 178 are merely supported by the brackets 184 and 186 since it is unnecessary to provide any vertical adjustment to the load levelling bars at this point.

Figure 7:
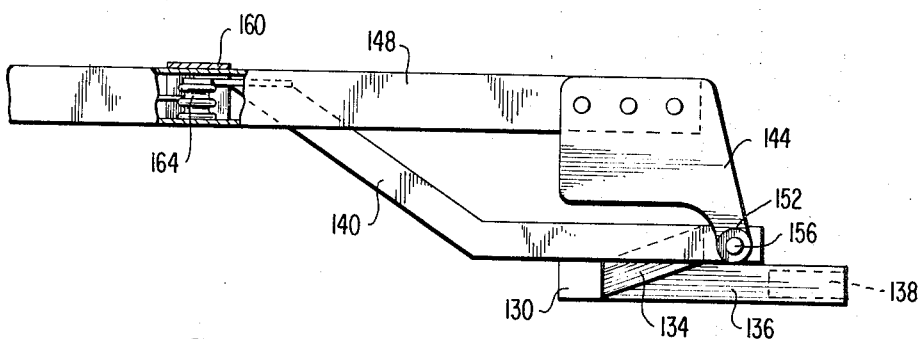
FIG. 7 is a side elevation view of the modified draw bar in FIG. 6.

When the trailer tongue is coupled to the hitch member by the ball and socket connection, the load levelling bars may be easily inserted into the sockets on the hitch member and into the brackets 184 and 186 on the trailer tongue. Under these loading conditions, the rear end of the towing vehicle would be substantially lower than the forward end of the towing vehicle and in order to level the towing vehicle, air pressure is supplied to the air bags 164, 166 and 168 by turning the valve 172 to provide communication from the air pressure source 170 to the air bags. As the air bags 164, 166 inflate, the forward ends of the side arms 140 and 142 of the truss assembly are raised upwardly as viewed in FIG. 7 and the loading forces imparted by the trailer to the rear end of the towing vehicle are distributed forwardly of the vehicle to level the same. Thus, it is no longer necessary to use the jack assembly on the trailer tongue to apply the load levelling forces to the vehicle and trailer but the same can be accomplished by the simple turning of a valve which may be conveniently located on the dashboard of the towing vehicle. Also, with this arrangement it will be no longer necessary to have different size and strength load levelling bars. It will only be necessary to regulate the pressure within the air bags and a suitable gauge or light arrangement may also be provided on the dashboard to indicate the proper amount of pressure needed for any particular load. Since it is no longer necessary to have the jack assembly on the trailer tongue, the present arrangement would be more readily adaptable to trailers having tongues of different configurations. The system for controlling the inflation of the air bags in FIG. 6, may also be utilized to control the inflation and deflation of the single air bag arrangement previously shown in FIG. 3.

Even though it will be possible to eliminate the need for a jack on the trailer tongue while using the air bag arrangement described in the previous embodiments, there are so many instances where a jack assembly will be necessary to apply the load levelling forces to the bars where the hitch is used with a draw bar arrangement which is not pivoted or provided with air bags. An improved type of jack assembly for applying load levelling forces to the load levelling bars is shown in FIGS. 10–12 inclusive. Numerous trailers are being built today wherein the tongue is provided with a center bar 200 as well as the two converging side bars 202 and 204. As a result, it is more difficult to adapt a jack to the trailer tongue so that the forces may be applied to load levelling bars which extend rearwardly in a position substantially to and beneath the center bar 200 of the trailer tongue.

According to the present embodiment a pair of angle irons 206 and 208 are mounted transversely of the trailer tongue. It is also possible to utilize square tubular stock or any other suitable stock in lieu of the angle irons. An inverted U-shaped bracket 210 is bolted to and extends between the two upright portions of the angle irons 206 and 208. The bracket 210 does not extend the entire length of the angle irons 206 and 208 but only extends on opposite sides of the center bar 200 a distance sufficient to support a jack assembly. A transversely extending groove 212 is formed in the middle of the bracket 210 and a pair of jack post receiving apertures 214 and 216 extend through the bracket 210 on opposite sides of the center bar 200. A joint member 218 is mounted on a plate 220 by an suitable means. The plate 220 is substantially coextensive with the support bracket 210 and is formed with a transverse groove 222 which is adapted to rest in the groove 212 in the bracket 210. The curvature of the groove 222 is such that when the plate 220 is disposed horizontally the flanges of the plate are spaced from the upper surface of the bracket 210. This is best shown in FIG. 12. The jack 218 is provided with a post 224 which may be raised and lowered by any suitable means either mechanical or fluid. The post 224 bears on the cross bar 226 which is secured at its opposite ends to a pair of vertically extending posts 228 and 230. The posts 228 and 230 extend downwardly through guide sleeves 232 and 234 which are secured in the apertures 214 and 216 by any suitable means such as welding or the like. The post 228 and 230 are interconnected at their lower ends by means of a pair of parallel spaced-apart cross bars 236 and 238. Divider pads or blocks 240 and 242 are secured to each of the cross bars 236 and 238 to prevent the load levelling bars which rest thereon from sliding transversely of the bars. As the result of having two parallel spaced-apart cross bars 236 and 238, it is possible to obtain two different load levelling characteristics for every setting of the jack. In order to hold the jack in any particular setting, each of the posts 228 and 230 are provided with a plurality of notches 244 which cooperate with pivoted pawl members 246 and 248 pivoted to the guide sleeves 234 and 232, respectively. Since the jack support plate 220 is substantially coextensive with the bracket plate 210, the plate 210 must also be provided with apertures therethrough sufficiently large to allow the passage of the guide sleeves 232 and 234 therethrough with sufficient clearance to allow pivotal movement of the plate 220 relative to the bracket 210. The pivotal movement between the plate 220 and the bracket 210 is limited by the forward and rearward edges of the plate 220 contacting the upper surface of the angle irons 206 and 208 respectively. The pivotal movement allows for minor forward and rearward shifting movements of the load levelling bars during a towing operation. It this slight pivotal movement of the jack assembly and the load levelling bar supports assembly was not provided the load levelling bars would shift longitudinally relative to the surfaces upon which they rest and possibly produce a snapping or popping sound which might prove irritating to a driver of the vehicle.

While the invention has been particularly shown and described with reference to a preferred embodiment thereof, it will be understood by those skilled in the art, that various changes in form and details may be made therein without departing from the spirit and scope of the invention.

What is claimed is:

1. A trailer hitch comprising draw bar means adapted to be secured to a towing vehicle, first connecting means detachably secured to said draw bar means, second connecting means adapted to be secured to the forward end of a trailer and detachably engaging said first connecting means, vertical post means mounted on said first connecting means, load levelling bar means pivotally mounted on said first connecting means for swinging movement in a generally horizontal plane about said post means, support means adapted to be mounted on said trailer engaging said load levelling bar means and cam means disposed intermediate said load levelling bar means and said first connecting means for varying the forces transmitted through said load levelling bar means upon swinging movement of said load levelling bar means about said post means said load levelling bar means being comprised of two independent housing members disposed adjacent to each other and extending rearwardly from said post means, a rearwardly opening socket in each of said sockets, an upstanding bracket having a bore therein orthogonally disposed relative to said bars secured to the upper surface of each housing member adjacent each other, and a connecting rod extending between said brackets in said bores for pivotally coupling said housing members for movement relative to each other.

2. A trailer hitch as set forth in claim 1 further comprising anti-sway braking means including a first flat friction member non-rotatably mounted on said first connecting means adjacent said post means and a second flat friction member operably connected to said load levelling bar means and disposed in engagement with said first friction member for rotation about said vertical post means with said load levelling bar means whereby force is imparted through said load levelling bar means to press said friction members into engagement with each other.

3. A trailer hitch as set forth in claim 1 wherein said cam means is comprised of first and second cam discs concentrically disposed about said post means and having complementary beveled engaging surfaces, one of said discs being non-rotatably secured to said first connecting means and the other of said discs having means for connecting said load levelling bar means thereto for conjoint rotation.

4. A trailer hitch comprising main body means adapted to be secured to a draw bar means on a towing vehicle, coupling means on said main body for releasably coupling a trailer to said main body means, post means on said main body means disposed in vertical alignment with said coupling means, load levelling bar means supported at one end for pivotal movement about said post means and cam means disposed intermediate said load levelling bar means and said main body means for varying the forces transmitted through said load levelling bar means upon pivotal movement of said load levelling bar means relative to said post means said load levelling bar means being comprised of two independent housing members disposed adjacent to each other and extending rearwardly from said post means, a rearwardly opening socket in each of said housing members, a resilient load levelling bar removably disposed in each of said sockets, an upstanding bracket having a bore therein orthogonally disposed relative to said bars secured to the upper surface of each housing member adjacent each other and a connecting rod extending between said brackets in said bores for pivotally coupling said housing members for movement relative to each other.

5. A trailer hitch as set forth in claim 4 further comprising anti-sway braking means including the first flat friction member non-rotatably mounted on said main body means adjacent said vertical post means and a second flat friction member rotatably connected to said load levelling bar means and disposed in engagement with said first friction member for rotation about said vertical post means with said load levelling bar means whereby the forces imparted to said load levelling bar means will press said friction members into engagement with each other.

6. A trailer hitch as set forth in claim 4 wherein said cam means is comprised of first and second cam discs concentrically disposed about said post means and having complementary beveled engaging surfaces thereon, one of said discs being non-rotatably secured to said main body means and the other of said discs being operably secured to said load levelling bar means for conjoint rotation therewith.

* * * * *